(12) United States Patent
Priyadarshi

(10) Patent No.: US 8,990,574 B1
(45) Date of Patent: Mar. 24, 2015

(54) SECURE DEVICE AUTHENTICATION PROTOCOL

(75) Inventor: Shaiwal Priyadarshi, San Diego, CA (US)

(73) Assignee: Prima Cinema, Inc., Carlsbad, CA (US)

( * ) Notice: Subject to any disclaimer, the term of this patent is extended or adjusted under 35 U.S.C. 154(b) by 714 days.

(21) Appl. No.: 13/267,265

(22) Filed: Oct. 6, 2011

Related U.S. Application Data

(60) Provisional application No. 61/390,361, filed on Oct. 6, 2010.

(51) Int. Cl.
*H04L 29/06* (2006.01)
*H04N 21/4363* (2011.01)
*H04L 9/32* (2006.01)

(52) U.S. Cl.
CPC ...... *H04N 21/43635* (2013.01); *H04L 63/0823* (2013.01); *H04L 9/3273* (2013.01)
USPC ........................................................ 713/176

(58) Field of Classification Search
CPC ............. H04L 63/0823; H04L 9/3273; H04N 21/43635
USPC ........................................................ 713/176
See application file for complete search history.

(56) References Cited

U.S. PATENT DOCUMENTS

| | | | |
|---|---|---|---|
| 6,738,427 B2 | 5/2004 | Zetts | |
| 6,914,637 B1 | 7/2005 | Wolf et al. | |
| 7,096,481 B1 | 8/2006 | Forecast et al. | |
| 7,120,251 B1 * | 10/2006 | Kawada et al. | 380/201 |
| 7,565,649 B2 | 7/2009 | Sasabe | |
| 7,571,471 B2 | 8/2009 | Sandhu et al. | |
| 7,734,045 B2 | 6/2010 | Sandhu et al. | |
| 7,739,744 B2 | 6/2010 | Burch et al. | |
| 7,774,824 B2 | 8/2010 | Ross | |
| 8,392,709 B1 * | 3/2013 | Agrawal | 713/169 |
| 2005/0278775 A1 | 12/2005 | Ross | |
| 2007/0200918 A1 | 8/2007 | Kwon et al. | |
| 2007/0203850 A1 | 8/2007 | Singh et al. | |
| 2007/0220575 A1 | 9/2007 | Cooper et al. | |
| 2007/0220594 A1 | 9/2007 | Tulsyan | |
| 2007/0234408 A1 | 10/2007 | Burch et al. | |
| 2007/0258585 A1 | 11/2007 | Sandhu et al. | |
| 2007/0258595 A1 | 11/2007 | Sandhu et al. | |
| 2008/0126591 A1 | 5/2008 | Kwon | |
| 2008/0271104 A1 | 10/2008 | Perry et al. | |
| 2008/0289030 A1 | 11/2008 | Poplett | |
| 2008/0307515 A1 | 12/2008 | Drokov et al. | |
| 2009/0012901 A1 | 1/2009 | Singh et al. | |
| 2009/0037388 A1 | 2/2009 | Cooper et al. | |
| 2009/0116703 A1 | 5/2009 | Schultz | |

(Continued)

OTHER PUBLICATIONS

Ramkumar et al.; A DRM Based on Renewable Broadcast Encryption; 2005; Retrieved from the Internet <URL: proceedings.spiedigitallibrary.org/proceeding.aspx?articleid=876291>; pp. 1-11 as printed.*

Sui et al.; A critical Analysis and Improvement of AACS Drive-Host Authentication; 2008; Retrieved from the Internet <URL:link.springer.com/chapter/10.1007%2F978-3-540-70500-0_4?LI=true#page-1>; pp. 1-16 as printed.*

(Continued)

*Primary Examiner* — Michael Chao
(74) *Attorney, Agent, or Firm* — Barcelo, Harrison & Walker, LLP

(57) ABSTRACT

Disclosed is a system and method by which a multimedia source device communicates with a display device, allowing the multimedia devices to securely confirm the identity of the devices and confirm their trustworthiness through a trust authority.

1 Claim, 4 Drawing Sheets

(56) References Cited

U.S. PATENT DOCUMENTS

| | | | |
|---|---|---|---|
| 2009/0141810 A1 | 6/2009 | Tabatabai et al. | |
| 2009/0217043 A1* | 8/2009 | Metke et al. | 713/171 |
| 2009/0220075 A1 | 9/2009 | Sidhu et al. | |
| 2009/0260043 A1 | 10/2009 | Tatsuta et al. | |
| 2010/0132019 A1 | 5/2010 | Hardt | |
| 2010/0153451 A1 | 6/2010 | Delia et al. | |
| 2010/0202609 A1 | 8/2010 | Sandhu et al. | |
| 2010/0269147 A1 | 10/2010 | Zetterower et al. | |
| 2011/0289113 A1* | 11/2011 | Arling et al. | 707/769 |

OTHER PUBLICATIONS

Dekun Zou, Nicolas Prigent, and Jeffrey Bloom, Compressed Video Stream Watermarking for Peer-to-Peer Based Content Distribution Network, Thomson Corporate Research, <ULR: http://www.videotechresearch.com/Jeffrey_Bloom>, Proceedings of the IEEE International Conference on Multimedia and Expo (ICME) 2009.

CEA (Consumer Electronics Association) Standard, A DTV Profile for Uncompressed High Speed Digital Interfaces, CEA-861-E, <ULR: http://www.CE.org>, Date: Mar. 2008.

Display-Port (Digital Display Interface, developed by: VESA (Video Electronics Standards Association), title: DisplayPort Technical Overview, <URL: http://www.displaysearch.com>, Date: May 2010.

* cited by examiner

SECURE DEVICE AUTHENTICATION PROTOCOL

CROSS-REFERENCE TO RELATED APPLICATIONS

This application claims the benefit of Provisional Application Ser. No. 61/390,361, filed on Oct. 6, 2010, the contents of which are herein incorporated by reference in their entirety.

BACKGROUND OF THE DISCLOSURE

1. Field of the Disclosure

The disclosure generally relates to the field of device authentication, more particularly, for example, to systems and methods in which a multimedia source device communicates with a multimedia sink device (such as a display, or signal distributor), wherein the multimedia source device confirms the identity of the sink device and confirms its trustworthiness through a trust authority.

2. General Background

Digital audio/video source devices (e.g., item 140 shown in FIG. 1), such as set top boxes, DVD players, Blu-ray players, media servers and video game consoles, typically connect to a compatible digital sink device (herein referred to as a "display device," such as item 150 shown in FIG. 1) such as an A/V receiver, digital television, digital projector or monitor, via a digital audio/video interface that transmits digital data from the source device to the output device. Commonly used digital audio/video interfaces include HDMI (High-Definition Multimedia Interface) and DVI (Digital Visual Interface). FIG. 1 provides an example of an HDMI-based digital audio/video interface.

As shown in FIG. 1, the HDMI interface (100) can be described as being formed of three communication channels, including a transition minimized differential signaling (TMDS) channel (110), a display data channel (DDC) (120), and a consumer electronics control (CEC) channel (130). In addition, audio/video (A/V) data, information on an apparatus, and control commands may be transmitted and received through the HDMI. The TMDS channel is typically used for transmitting and receiving video signals and audio signals. The DDC is a data communication standard between a source device and a display device, defined by VESA, which is an international standards-setting organization. When booting a system, the output apparatus realizes an optimum image by referring to information about the monitor. In general, the source device transmits optimum video signals and audio signals with reference to enhanced extended display identification data (E-EDID) of the display device. The CEC channel is an additional protocol for performing high-level control functions in the HDMI interface.

As is typical with digital audio/video interfaces, "in-band" data, i.e., data that is contained within the audio/video data stream, and "out-of-band" data, i.e., data that is not contained within the audio/video data stream, are used to provide an essentially self-configuring link between the digital audio/video source device and a compatible digital output device. Thus, "out-of-band" data is communicated back to the source device from the display device via the interface, allowing for two-way communication between the source and display device.

In addition to sending in-band audio/video data to the digital audio/video display device, most digital sources also send data to the display device regarding the A/V data format of the audio/video source through a data block sometimes referred to as an "InfoFrame." In the case of HDMI, this InfoFrame is typically compliant with one or more revisions of EIA/CEA-861, an industry standard.

The display device in most digital audio/video interfaces typically allows the device's EDID (Extended Display Identification Data) information to be read back by the source device, which is a data structure provided by a digital display to describe its capabilities to a source (e.g., graphics card, set-top box). For instance, the EDID enables a source device to know the make and model of the projector to which it is connected, as well as the capabilities of that projector.

Although the EDID of a display device provides for some level of security by allowing a source device to determine the type and capability of such a display device, as currently implemented by most consumer electronics digital display devices, the data block on an EDID itself is not secure, and may be subject to spoofing or may otherwise become compromised. Although HDCP (High-bandwidth Digital Content Protection) protects audio/video data being transmitted via HDMI by obfuscating the data, in the event that the security of the HDCP scheme is compromised, the potential for spoofing of the EDID allows for a potential breach in the security of the system.

It is desirable to address the limitations in the art. For example, it may be desirable to provide a method or system for using a digital audio/video source device, using common digital audio/video interfaces, such as HDMI or DVI, to verify that a digital audio/video display device is a genuine, trustworthy device without relying solely on the EDID of the display device to confirm the identity and security of such a display device. Furthermore, it is desirable to provide a method that can be used to retrofit existing deployed products with these authentication capabilities.

SUMMARY

Systems and methods are disclosed with reference to certain exemplary embodiments, by which a multimedia source device communicates to a display device, allowing the multimedia source device to confirm the identity of the display device (and vice-versa) and confirm its trustworthiness through a trust authority. Other aspects and advantages of various aspects of the present invention can be seen upon review of the figures and of the detailed description that follows.

BRIEF DESCRIPTION OF THE DRAWINGS

By way of example, reference will now be made to the accompanying drawings, which are not to scale.

DETAILED DESCRIPTION

Figure 1:
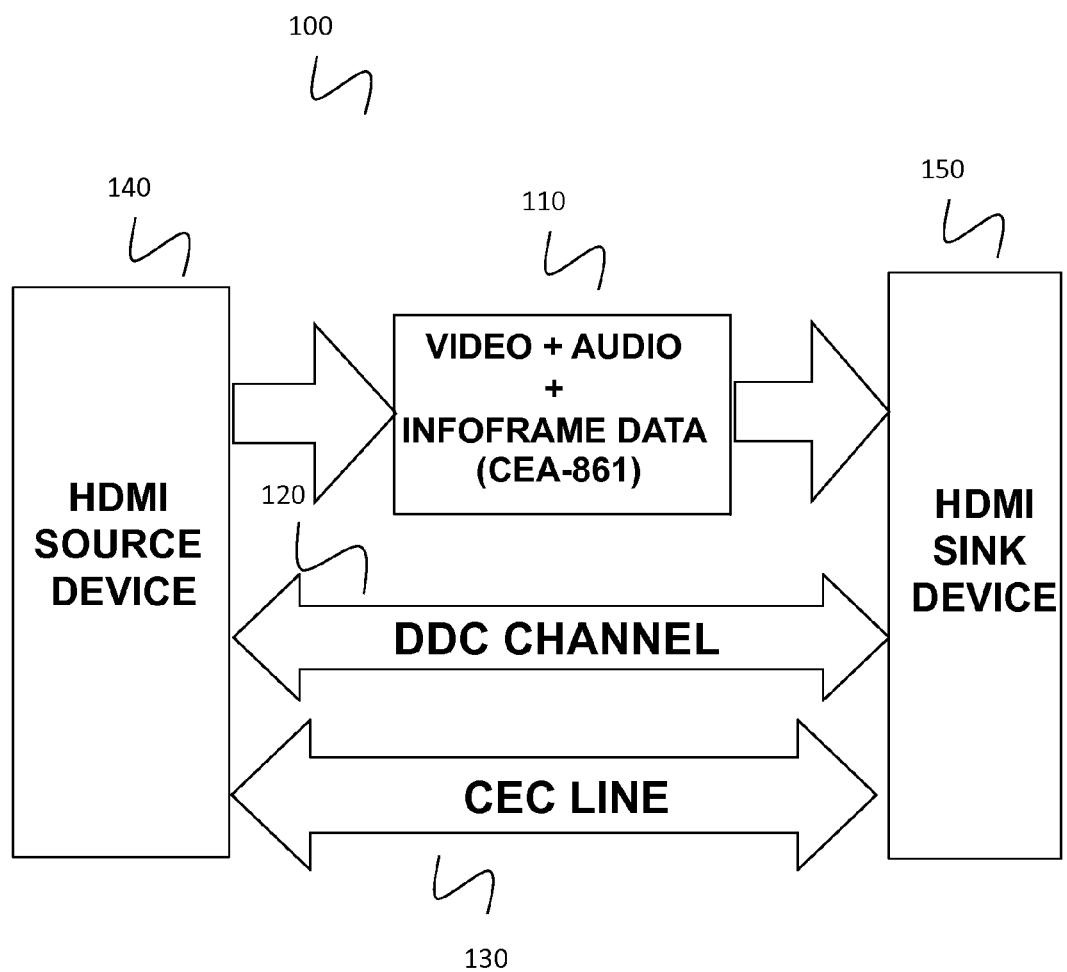
FIG. 1 illustrates an exemplary HDMI-based digital audio/video interface.

Those of ordinary skill in the art will realize that the following description of the present invention is illustrative only and not in any way limiting. Other embodiments of the invention will readily suggest themselves to such skilled persons, having the benefit of this disclosure. Reference will now be made in detail to specific implementations of the present invention as illustrated in the accompanying drawings. The same reference numbers will be used throughout the drawings and the following description to refer to the same or like parts.

Further, certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (C-Sharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

The term "machine-readable medium" should be understood to include any structure that participates in providing data which may be read by an element of a computer system. Such a medium may take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example, a floppy disk, a flexible disk, a hard disk, a magnetic tape, any other magnetic medium, a CD-ROM, a DVD, any other optical medium.

Figure 2:
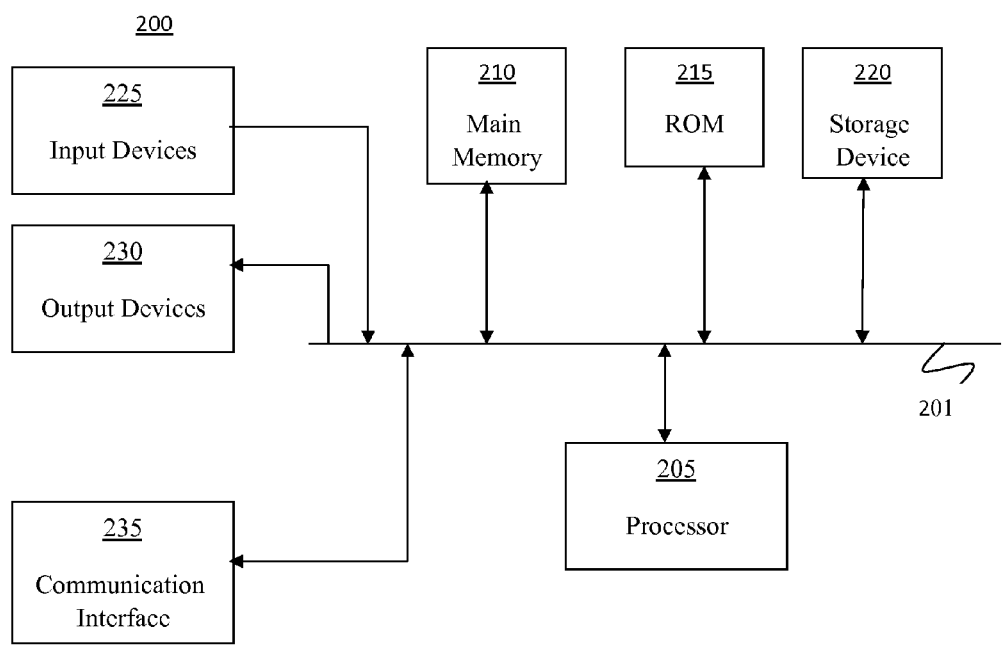
FIG. 2 illustrates an exemplary computing device that may be used to implement aspects of certain embodiments of the present invention.

FIG. 2 is an exemplary diagram of a computing device 200 that may be used to implement aspects of certain embodiments of the present invention. Computing device 200 may include a bus 201, one or more processors 205, a main memory 210, a read-only memory (ROM) 215, a storage device 220, one or more input devices 225, one or more output devices 230, and a communication interface 235. Bus 201 may include one or more conductors that permit communication among the components of computing device 200.

Processor 205 may include any type of conventional processor, microprocessor, or processing logic that interprets and executes instructions. Main memory 210 may include a random-access memory (RAM) or another type of dynamic storage device that stores information and instructions for execution by processor 205. ROM 215 may include a conventional ROM device or another type of static storage device that stores static information and instructions for use by processor 205. Storage device 220 may include a magnetic and/or optical recording medium and its corresponding drive.

Input device(s) 225 may include one or more conventional mechanisms that permit a user to input information to computing device 200, such as a keyboard, a mouse, a pen, a stylus, handwriting recognition, voice recognition, biometric mechanisms, and the like. Output device(s) 230 may include one or more conventional mechanisms that output information to the user, including a display, a printer, a speaker, and the like. Communication interface 235 may include any transceiver-like mechanism that enables computing device 200 to communicate with other devices and/or systems. For example, communication interface 235 may include mechanisms for communicating with another device or system via a network, such as network 105.

As will be described in detail below, computing device 200 may perform operations based on software instructions that may be read into memory 210 from another computer-readable medium, such as data storage device 220, or from another device via communication interface 235. The software instructions contained in memory 210 cause processor 205 to perform processes that will be described later. Alternatively, hardwired circuitry may be used in place of or in combination with software instructions to implement processes consistent with the present invention. Thus, various implementations are not limited to any specific combination of hardware circuitry and software.

In certain embodiments, the present invention provides for a method or system for a digital audio/video source device, using common digital audio/video interfaces, such as HDMI or DVI, to verify that a digital audio/video display device is secure without relying solely on the EDID of the display device to confirm the identity and security of such display device. As disclosed herein, a method and system is described in which a data packet is sent by a digital audio/video source device through a common digital audio/video interface to a display device. In one embodiment, the data packet is transmitted as in-band data along with the audio/video data being sent to the display device.

In that case, the display device receives the data packet and, if the display device is a secure device, it securely signs the data packet and allows the signature to be read back by the source device. In one embodiment, the display device incorporates a firmware patch that enables the display device to recognize the data packet and securely sign the data packet. Such a firmware patch is installed by the display device manufacturer, or is securely transmitted to the display device through any of numerous secure protocols that are known to those of skill in the art. In another embodiment, the display device's ability to recognize and sign the data packet is included in its hardware.

Upon receipt of the signed data packet, the source device determines the identity of the display device, and verifies, independently of the EDID provided by the display device, whether the display device is secure or otherwise compatible with the source device, via a look-up table, database, installed firmware, or any other suitable mechanism. In one embodiment, the signature identifies the manufacture and type of device signing the data packet. In another embodiment, the signature is unique to every instance of a display device.

Figure 3:
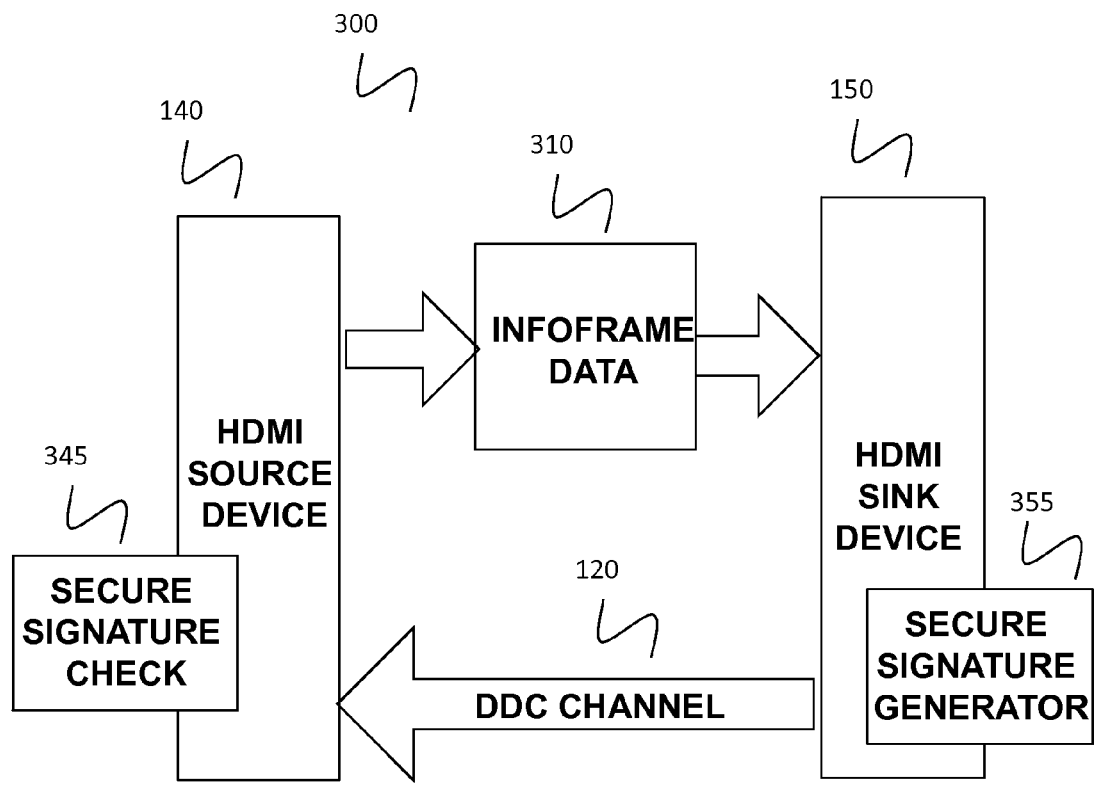
FIG. 3 illustrates an exemplary implementation of certain aspects of the present invention, in which a data packet sent by a source device to a display device is in the form of an InfoFrame, as used in the HDMI protocol.

In yet another embodiment, the data packet sent by the source device is in the form of an InfoFrame, as used in the HDMI protocol. FIG. 3 illustrates an exemplary implementation of this arrangement (300). The InfoFrame (310) is securely signed by the display device using any of numerous trusted techniques known to those skilled in the art (such as RSA signing), allowing the source device to ensure that the signature securely and uniquely identifies the display device. Once a unique, trusted identity has been established for the display device, the source device can look up the display device's identity using a device trust authority.

In one embodiment, the secure certificate authority uses commonly known public key infrastructure (PKI) techniques, and the resulting signature provides secure identification of the device. The specific identity of the device is then verified independently of the claimed device manufacturer. In such an embodiment, it is assumed that the display device has a PKI key-set assigned to it, for example through a firmware patch or as integrated by a manufacturer in hardware.

In this embodiment, a data structure, including a new one as described herein according to aspects of the present invention, is transmitted through the InfoFrame method to the display device, and the display device then creates a hash of the InfoFrame data (using an algorithm such as SHA-1 or any other suitable algorithm). The display device then encrypts the hash using its Private Key to generate a signature block (see, e.g., item 355 in FIG. 3). The display device then stores its Public Key and the signature block into a memory device located on the DDC channel.

The source device then reads the memory (and signature) back across the DDC channel (120) after waiting a period of time (to give the display device time to generate the signature). The source device then verifies the signature using the display device's Public Key. The display device's status is then verified by searching through a database of trusted devices using the display device's Public Key (see, e.g., item 345 in FIG. 3). The source device then determines whether to commence or continue sending the display device its digital audio/video data.

As an extension to this concept, a display chain consisting of multiple display devices in series, with the output of one display device (e.g., an AV receiver) feeding the input of another display device (e.g., a projector), can also be verified. The verification follows standard PKI-based daisy-chained authentication through signature chaining. In this scenario, the first display device either replaces or adds its signature to the InfoFrame that it then relays to the next display device; each display device either replaces the InfoFrame data with its own signature, or chains its signature to the code in the InfoFrame. The source device can then read back the signature over EDID from each display device in the chain, verifying each link on the way; or the source could verify all the embedded signatures in a chained-signature-block from the final display device in the chain.

Figure 4:
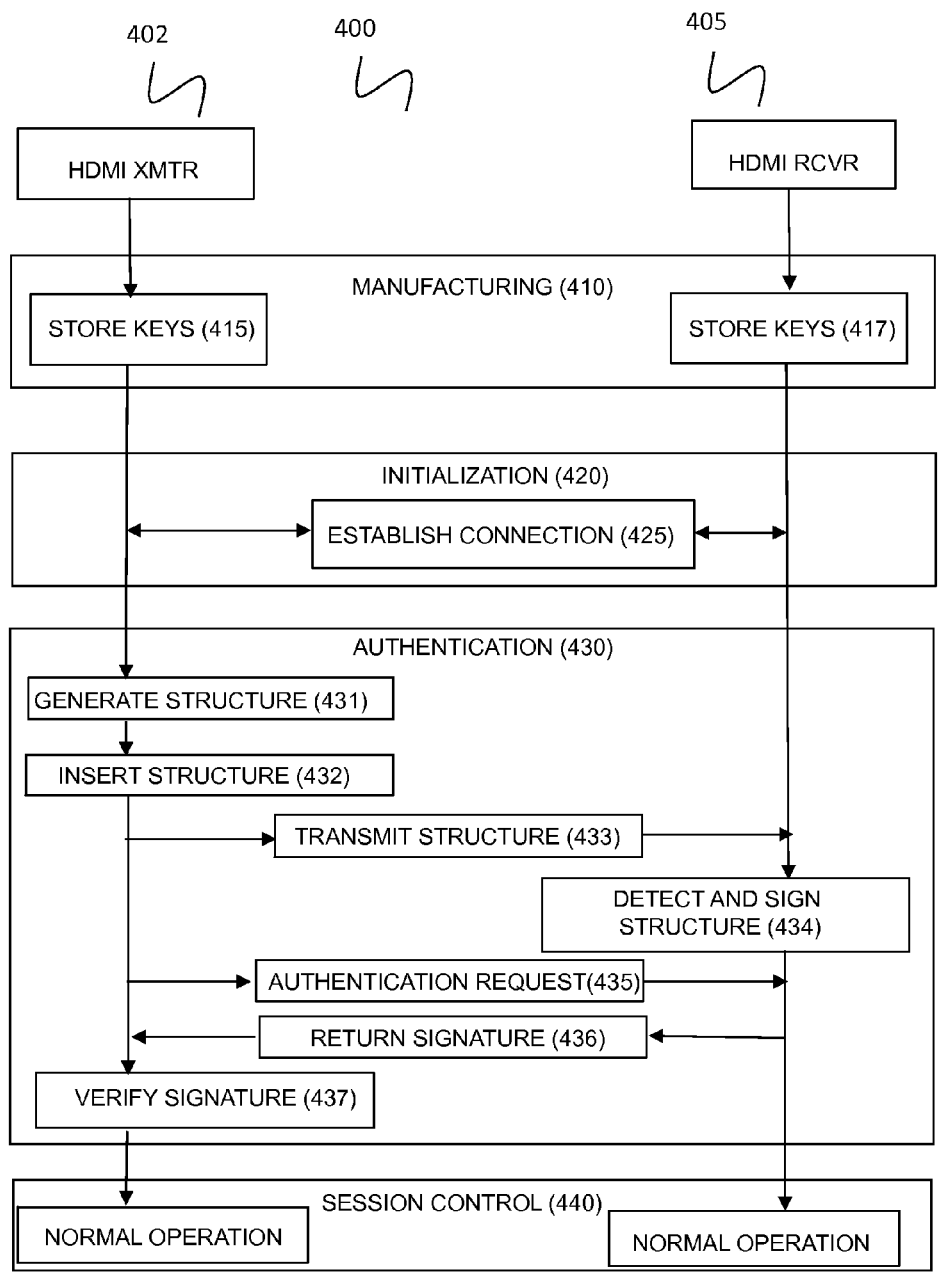
FIG. 4 illustrates another exemplary implementation of certain aspects of the present invention.

FIG. 4 illustrates another exemplary implementation (400) of certain aspects of the present invention. During a manufacturing phase (410), at step (415) a PKI key set is assigned to and stored in a multimedia source device such as HDMI transmitter (402), and at step (417) a corresponding PKI key set is assigned to and stored in a multimedia sink device such as HDMI display/receiver (405). During initialization phase (420), an electrical connection (425) is established between transmitter (402) and display/receiver (405) for transmitting an audio/video data stream from transmitter (402) to display/receiver (405).

During authentication phase (430), at step (431) an authentication data structure is generated at transmitter (402) for transmission from transmitter (402) to display/receiver (405). In one embodiment the authentication structure may comprise a unique data "blob" for each audio/video data stream transmission session. The blob may comprise any suitable data, such a combination of a predetermined still video pattern and/or configuration data unique to transmitter (402) such as an identifier (e.g., MAC address) of a networking facility (e.g., Ethernet port) on the transmitter (402). At part of step 431, the authentication data structure (e.g., "blob") may be signed with the PKI private key associated with the transmitter (402).

At step (432), the blob, the transmitter's PKI public key, and a unique signature block are inserted into an InfoFrame or a video frame, along with markers to indicate an authentication process request. At step (433), the authentication data structure is transmitted from transmitter (402) to display/receiver (405) within an audio/video data stream between transmitter (402) and display/receiver (405) (e.g., within the in-band audio/video HDMI data stream across the primary HDMI channel, within an InfoFrame or video frame).

At step (434), display/receiver (405) detects that the incoming audio/video data stream contains an in-band authentication request and authentication structure, then creates a hash of a portion of said authentication data structure (e.g., verifies the integrity of the received blob, public key, and signature block), and encrypts the hash using a private key associated with display/receiver (405) to generate its own signature block.

At step (435), after waiting a sufficient amount of time for display/receiver (405) to perform step (434), transmitter (402) transmits an authentication request to display/receiver (405) to obtain the Device ID of display/receiver (405), along with the PKI public key of display/receiver (405) and the signature block created by display/receiver (405) in step (434).

At step (436), the Device ID of display/receiver (405), along with the PKI public key of display/receiver (405) and the signature block created by display/receiver (405) in step (434) are sent from display/receiver (405) to transmitter (402) (e.g., via HDMI DDC and/or CEC channels).

At step (437), transmitter (402) checks the information sent from display/receiver (405) to transmitter (402) in step (436), based on the public key associated with display/receiver (405). The trustworthiness of display/receiver (405) is verified in one embodiment by searching through a database of trusted devices based on the public key associated with display/receiver (405).

At session control phase (440), the audio/video data stream transmission session continues its normal operation (e.g., by performing HDCP session control).

The entire contents of each of the following documents are hereby incorporated by reference as if fully set forth herein: United States Published Patent Application Nos. 2008/0126591 A1, 2009/0260043 A1, and 2007/0200918 A1; U.S.

Pat. Nos. 6,914,637 and 7,565,649; and CEA Standard CEA-861-E (March, 2008) entitled "A DTV Profile for Uncompressed High Speed Digital Interfaces."

While the above description contains many specifics and certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art, as mentioned above. The invention includes any combination or subcombination of the elements from the different species and/or embodiments disclosed herein.

I claim:

1. A method for verifying the trustworthiness of connected multimedia devices, comprising:

storing a public key infrastructure (PKI) key set in said multimedia sink device;

storing a matching PKI key set in a multimedia source device;

establishing an electrical connection between said multimedia source device and said multimedia sink device for transmitting an audio/video data stream from said multimedia source device to said multimedia sink device;

generating an authentication data structure for transmission from said multimedia source device to said multimedia sink device;

at said multimedia source device, creating a hash of a portion of said authentication data structure, and encrypting said hash using a private key associated with said multimedia source device to generate a signature block;

transmitting said authentication data structure from said multimedia source device to said multimedia sink device in an HDMI InfoFrame within an audio/video data stream between said multimedia source device and said multimedia sink device;

at said multimedia sink device, detecting said authentication data structure, creating a hash of a portion of said authentication data structure, and encrypting said hash using a private key associated with said multimedia sink device to generate a signature block;

transmitting an authentication request from said multimedia source device to said multimedia sink device;

transmitting said signature block and a public key associated with said multimedia sink device from said multimedia sink device to said multimedia source device;

at said multimedia source device, verifying said signature block based on said public key associated with said multimedia sink device; and verifying the trustworthiness of said multimedia sink device by searching through a database of trusted devices based on said public key associated with said multimedia sink device.

* * * * *